United States Patent
Janevski et al.

(10) Patent No.: US 6,697,123 B2
(45) Date of Patent: Feb. 24, 2004

(54) ADAPTIVE PICTURE-IN-PICTURE

(75) Inventors: Angel Janevski, New York City, NY (US); Nevenka Dimitrova, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 413 days.

(21) Appl. No.: 09/822,442

(22) Filed: Mar. 30, 2001

(65) Prior Publication Data

US 2002/0140861 A1 Oct. 3, 2002

(51) Int. Cl.⁷ .................................................. H04N 5/45
(52) U.S. Cl. ....................................... 348/565; 348/567
(58) Field of Search ................................ 348/565, 566, 348/569, 588, 558, 700, 625

(56) References Cited

U.S. PATENT DOCUMENTS 5,455,632 A * 10/1995 Ichihara ...................... 348/565
5,555,026 A * 9/1996 Lee ............................. 348/565
5,574,507 A 11/1996 Baek ........................... 348/511
6,008,860 A 12/1999 Patton et al. ................ 348/565

FOREIGN PATENT DOCUMENTS

| DE | 19843919 A | 3/2000 | ............ H04N/5/45 |
| JP | 05268543 A | 10/1993 | ............ H04N/5/45 |
| JP | 07087392 A | 3/1995 | .......... H04N/5/272 |
| JP | 07236100 A | 9/1995 | ............ H04N/5/45 |

OTHER PUBLICATIONS

"Omni–Face Detection for Video/Image Content Description" by Gang Wei and Ishwar K. Sethi.

* cited by examiner

Primary Examiner—Victor R. Kostak

(57) ABSTRACT

In a television receiver having Picture-In-Picture (PIP), a controller analyzes the content of an auxiliary video signal forming a PIP image, and automatically adjusts the shape and transparency of the PIP image in accordance with the content of the auxiliary video signal.

3 Claims, 4 Drawing Sheets

ADAPTIVE PICTURE-IN-PICTURE

BACKGROUND OF THE INVENTION

1. Field of the Invention

The subject invention relates to television receivers having the capable of displaying Picture-In-Picture (PIP).

2. Description of the Related Art

PIP is a feature in a television receiver in which the picture from a video signal in a main channel fills the display, while the picture from a video signal in an auxiliary channel is sub-sampled and overlays a portion of the main picture on the display. This enables a user of the television receiver to monitor the video signal from an alternate source, e.g., a television channel from a second tuner, the signal from a video cassette recorder or a video camera, etc.

However, when displaying the PIP signal, a portion of the main picture is lost. Depending on the content of the main picture, the area occupied by the PIP picture may obscure an important portion of the main picture, for example, in sports, this important portion may be that devoted to displaying the current score, while in a movie, this portion may be that devoted to displaying the faces of the leading characters.

In order to alleviate this problem, it is known to be able to move the PIP picture to various different positions under control of the user, to reposition the PIP picture such that it does not obscure an important information of the main picture.

U.S. Pat. No. 6,008,860 discloses circuitry with which the size of the PIP picture may be selectively reduced to further obscure less of the main picture.

In each of the above instances, the PIP picture is invariably a reduced-size image of a full picture frame, there being no consideration for varying the shape of the PIP picture.

SUMMARY OF THE INVENTION

It is an object of the present invention to provide a television receiver having a PIP capability in which shape of the PIP image is adjusted automatically in dependence on the content of the PIP image.

The above object is achieved in a television receiver having a picture-in-picture (PIP) functionality, said television receiver comprising a main video path including an input for receiving a main video signal, and a main signal video processing circuit for processing the main video signal in the main video path; an auxiliary video path including an auxiliary input for receiving an auxiliary video signal, and an auxiliary signal video processing circuit for sub-sampling and processing the auxiliary video signal in the auxiliary video path; a display for displaying video signals; and means for selectively applying processed main video signal and the sub-sampled auxiliary video signal to the display such that an image from the sub-sampled auxiliary video signal overlies a portion of an image from the main video signal, wherein said selectively applying means comprises means for detecting and analyzing characteristics of the auxiliary video signal; and means for changing attributes of the PIP image in response to said detected and analyzed characteristics of the auxiliary video signal.

Co-pending U.S. patent application Ser. No. 09/822,456, filed concurrently with this application, discloses a television receiver having PIP capabilities, in which the size, shape, position and transparency of the PIP image is dependent on the content of the main video signal.

Applicants have determined that based on the content of the PIP image, the entire picture frame may not be needed and, instead of merely adapting the size, shape, transparency and position of the PIP image based on the content of the main video signal, an adapted shape of the PIP image based on the content of the PIP image may be used.

BRIEF DESCRIPTION OF THE DRAWINGS

With the above objects and advantages in mind as will hereinafter occur, the subject invention will be described with reference to the accompanying drawings, in which.

DESCRIPTION OF THE PREFERRED EMBODIMENTS

Figure 1:
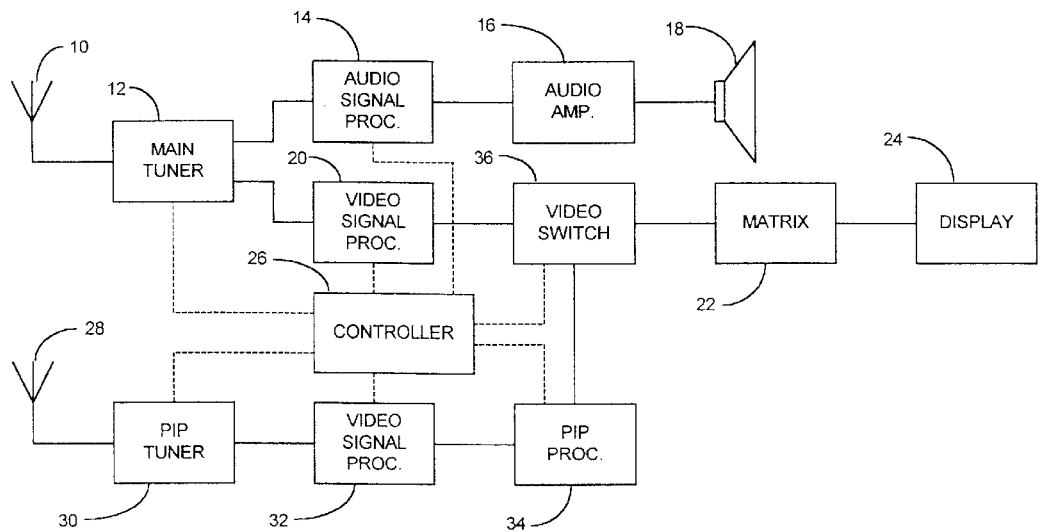
FIG. 1 shows a schematic block diagram of a known television receiver having the PIP function.

As shown in FIG. 1, a television receiver typically includes an input for receiving television signals. This is shown as an antenna 10 connected to a tuner 12. One output of the tuner 12 carries an audio portion of the television signal which is applied to an audio signal processing circuit 14 which, in turn, applies the audio signal to an audio amplifier 16 for amplification and then to a loudspeaker 18. Another output of the tuner 12 carries a video portion of the television signal which is applied to a video signal processing circuit 20 which, in turn, applies the video signal to a matrix circuit 22 for generating the color signals red (R), green (G) and blue (B), which are applied to a display 24. A controller 26, which may include a microprocessor, is connected to control inputs of the tuner 12, the audio signal processing circuit 14, and the video signal processing circuit 20, for tuning to the desired television program, and for controlling the audio and video signal processing.

In the case of Picture-In-Picture (PIP), the television receiver includes an input for an auxiliary television signal, which in this case is shown as a second antenna 28 and a second tuner 30. A second video signal processing circuit 32 is connected to the output of the second tuner 30 and provides a processed second video signal to a PIP processor 34. The PIP processor 34 sub-samples the processed second video signal and applies the sub-sampled video signal to one input of a video switch 36 arranged between the video signal processing circuit 20 and the display 22. The controller 26 is coupled to control inputs of the second tuner 30, the second video signal processing circuit 32, the PIP processor 34 and the video switch 36, for choosing the television program for the PIP, for controlling the processing of the auxiliary video signal, and for controlling the sub-sampling in the PIP processor 34 and the switching of the video switch 36 for controlling the size and position of the PIP image. In this prior art television receiver, if the PIP image obscures an important portion of the main picture, the user must take action, i.e., reduce the size of the PIP image, or move the PIP image to, for example, another of a plurality of pre-assigned regions on the display.

Figure 2:
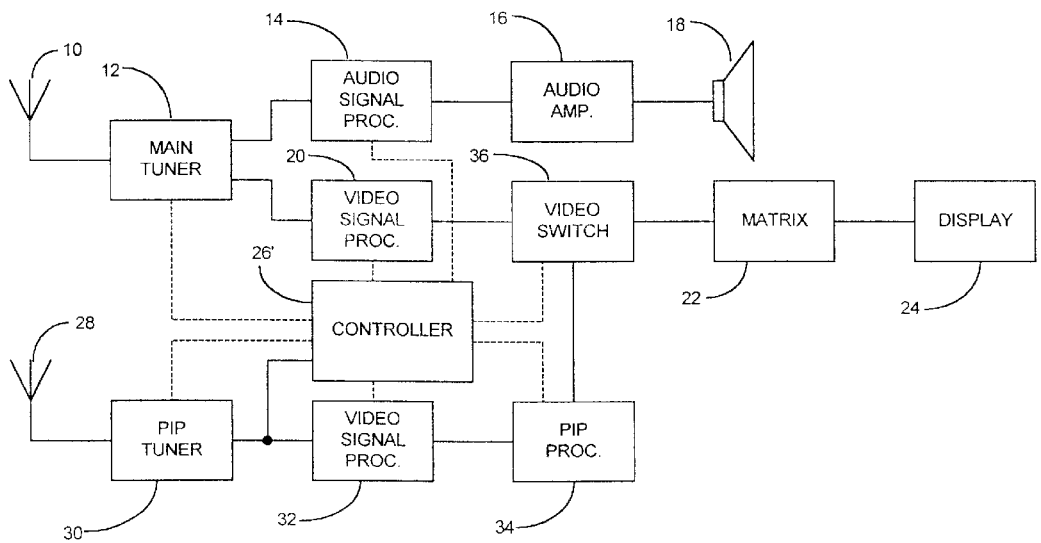
FIG. 2 shows a schematic block diagram of a television receiver in accordance with the subject invention.

FIG. 2 shows a block diagram of the television receiver incorporating the subject invention. It should be apparent that this television receiver is substantially similar to that shown in FIG. 1, with the exception that the video signal from the second tuner 30 is additionally applied to the controller 26'. The controller 26' includes means for analyzing the content of the auxiliary video signal for detecting various characteristics of the auxiliary video signal. For example, U.S. patent application Ser. No. 09/477,084, filed Dec. 30, 1999, discloses a method of detecting fast motion scenes in a video signal. Further, U.S. patent application Ser. No. 09/370,931, filed Aug. 9, 1999, discloses a method and apparatus for detecting text in a video signal. In addition, the article "OMNI-FACE DETECTION FOR VIDEO/IMAGE CONTENT DESCRIPTION" by G. Wei and I. K. Sethi, International Workshop on Multimedia Information Retrieval, ACM Multimedia conference 2000 (MIR2000), describes a method and apparatus for detecting faces in a video signal. These and other methods and apparatuses may be incorporated into the controller 26' to enable the analysis of the auxiliary video signal.

Figure 3:
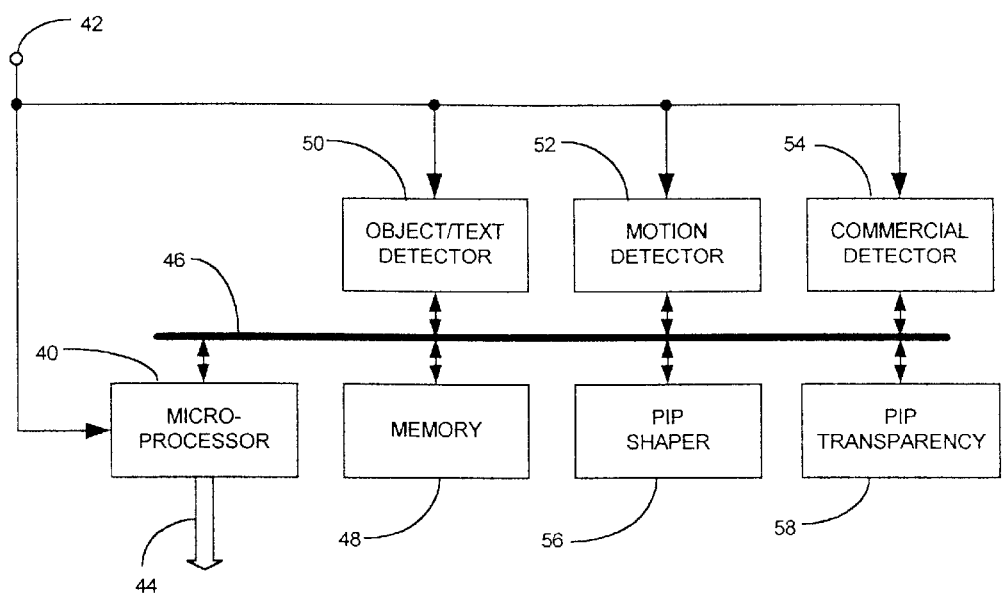
FIG. 3 shows a block diagram of the controller of FIG. 2.

FIG. 3 shows a block diagram of the controller 26' of FIG. 2. In particular, the auxiliary video signal from the second tuner 30 is applied to an input 42 of a microprocessor 40, which applies control signals to the various components in the television receiver via control signal outputs 44. The microprocessor 40 communicates via a bus 46 with a memory. 48. An object/text detector 50, motion detector 52 and commercial detector 54 are also coupled to the input 42 for receiving the auxiliary video signal. A PIP shaper 56 and a PIP transparency adjuster are provided for controlling the attributes of the PIP image, and are connected to the microprocessor 40 via the bus 46.

The object/text detector 50, the motion detector 52 and the commercial detector 54 analyze the auxiliary video signal to determine its characteristics and as such, for categorizing the content of the auxiliary video signal. This is then used by the microprocessor 40 to choose the appropriate shape and/or transparency of the PIP image which is put into effect by the PIP shaper 56 and the PIP transparency adjuster 58.

Figure 4A:
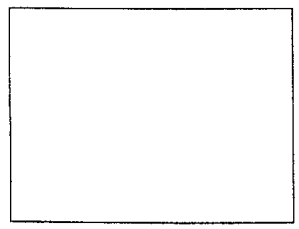
FIGS. 4A–4F show various shapes that may be used for the PIP image.
Figure 4B:
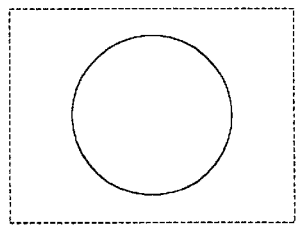
Figure 4C:
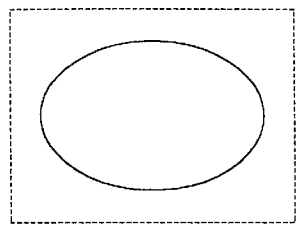
Figure 4D:
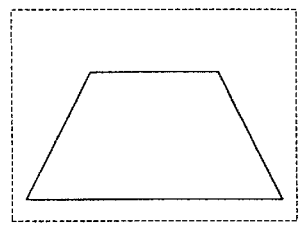
Figure 4E:
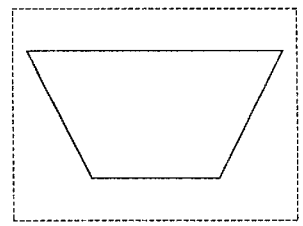
Figure 4F:
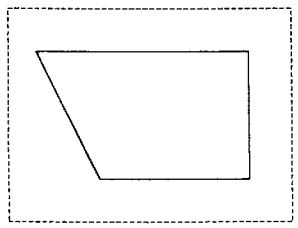

FIG. 4A shows a standard shape for a PIP image, while FIGS. 4B–4E show various other example shapes for the PIP image. When, for example, the auxiliary video signal is the performance of an ice skater, the ice skater is generally kept in the center of the picture frame by the camera, used to generate the video signal, panning the skating rink. The object/text detector 50 would then detect the position of the skater and the microprocessor 40 would direct the PIP shaper 56 to choose, for example, the circular shape of FIG. 4B. In the event of a news broadcast, there is very little motion (detected by the motion detector 52), and a person (detected by the object/text detector 50) is generally centrally located. In addition, text (also detected by the object/text detector 50) may appear at the bottom of the screen. In this situation, the microprocessor 40 may direct the PIP shaper 56 to choose the trapezoidal shape of FIG. 5D. In the case of, for example, a football game, while the action (detected by the motion detector 52) may be centered in the picture frame, often the current score and time information (detected by the object/text detector 50) is inserted in, for example, the upper right hand corner of the picture frame. In this situation, the microprocessor 40 may direct the PIP shaper 56 to select the shape shown in FIG. 5F.

While the auxiliary video signal may be truncated to fit the selected shape, alternatively, the portion of the auxiliary video signal appearing in the selected shape may be shown with no transparency, while the remaining portion of a standard picture frame (shown as a dotted line in FIGS. 4B–4F) may be shown with increased transparency (using the PIP transparency adjuster 58).

While separate means have been shown for performing the various functions of the controller 26', it should be understood that these functions may be performed by appropriate software programming stored in the memory 48 and operated upon by the microprocessor 40.

Figure 5:
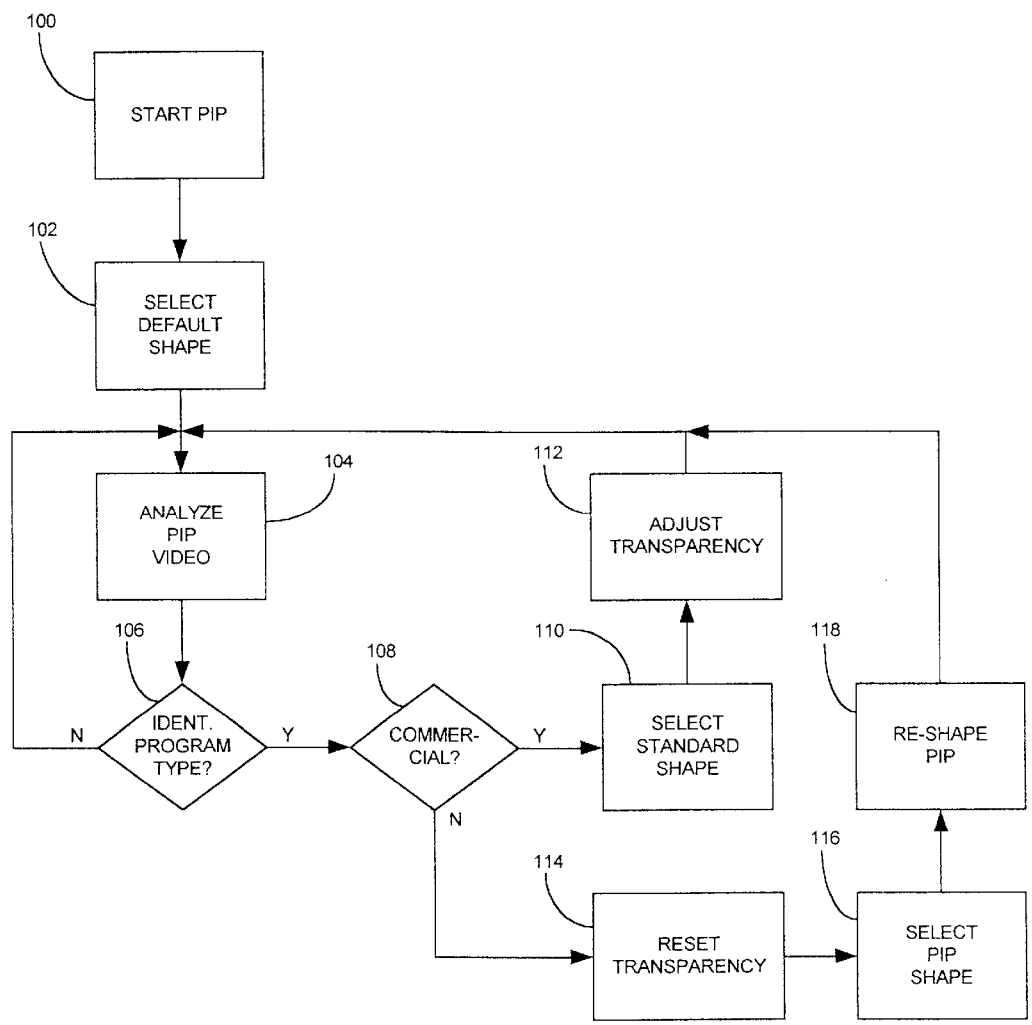
FIG. 5 shows a flowchart describing the operation of the invention.

FIG. 5 shows a flowchart of the operation of the adaptive PIP of the subject invention. At step 100, the user selects the PIP function. At step 102, the controller 26' sets the PIP at the default shape and, at step 104, the controller 26' analyzes the auxiliary video signal. The controller 26' then determines, at step 106, whether the type of programming can be identified from the analysis of the auxiliary video signal. If not, the controller 26 reverts to step 104. If so, the controller 26' then determines, at step 108 whether the programming is a commercial. If so, the controller 26' then sets the PIP to the standard shape at step 110, adjusts the transparency of the PIP image at step 112, and then reverts to step 104. If the programming is not a commercial (at step 108), the controller 26', at step 114, resets the PIP image transparency, selects a shape for the PIP image at step 116, re-sizes the PIP image at step 118, and then reverts to step 104.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A television receiver having a picture-in-picture (PIP) functionality, said television receiver comprising:

a main video path including an input for receiving a main video signal, and a main signal video processing circuit for processing the main video signal in the main video path;

an auxiliary video path including an auxiliary input for receiving an auxiliary video signal, and an auxiliary signal video processing circuit for sub-sampling and processing the auxiliary video signal in the auxiliary video path;

a display for displaying video signals; and means for selectively applying the processed main video signal and the sub-sampled auxiliary video signal to the display such that a PIP image from the sub-sampled auxiliary video signal overlies a portion of an image from the main video signal, wherein said selectively applying means comprises:

means for detecting and analyzing characteristics of the auxiliary video signal; and means for changing attributes of the PIP image in response to said detected and analyzed characteristics of the auxiliary video signal, wherein said attributes of the PIP image include shape and transparency.

2. A television receiver having a picture-in-picture (PIP) functionality, said television receiver comprising:

a main video path including an input for receiving a main video signal, and a main signal video processing circuit for processing the main video signal in the main video path;

an auxiliary video path including an auxiliary input for receiving an auxiliary video signal, and an auxiliary signal video processing circuit for sub-sampling and processing the auxiliary video signal in the auxiliary video path;

a display for displaying video signals; and means for selectively applying the processed main video signal and the sub-sampled auxiliary video signal to the display such that a PIP image from the sub-sampled auxiliary video signal overlies a portion of an image from the main video signal, wherein said selectively applying means comprises:

means for detecting and analyzing characteristics of the auxiliary video signal; and means for changing attributes of the PIP image in response to said detected and analyzed characteristics of the auxiliary video signal, wherein said characteristics include motion, texture and content.

3. The television receiver as claimed in claim 2, wherein said content includes faces of persons, text, and cuts.

* * * * *